(12) United States Patent
Willis

(10) Patent No.: US 11,708,015 B1
(45) Date of Patent: Jul. 25, 2023

(54) CONVERTIBLE CANOPY FOR CAR SEATS

(71) Applicant: Seojeong Lee Willis, Charlotte, NC (US)

(72) Inventor: Seojeong Lee Willis, Charlotte, NC (US)

(*) Notice: Subject to any disclaimer, the term of this patent is extended or adjusted under 35 U.S.C. 154(b) by 0 days.

(21) Appl. No.: 18/071,232

(22) Filed: Nov. 29, 2022

Related U.S. Application Data

(63) Continuation-in-part of application No. 29/811,612, filed on Oct. 15, 2021.

(60) Provisional application No. 63/416,499, filed on Oct. 15, 2022, provisional application No. 63/414,564, filed on Oct. 9, 2022.

(51) Int. Cl.
  *B60N 2/90* (2018.01)
(52) U.S. Cl.
  CPC ..................... *B60N 2/90* (2018.02)
(58) Field of Classification Search
  CPC ........................................ B60N 2/90
  USPC .................................... 297/184.13
  See application file for complete search history.

(56) References Cited

U.S. PATENT DOCUMENTS

| | | | | |
|---|---|---|---|---|
| 5,437,061 A | * | 8/1995 | Kenner | A41D 3/08 297/184.13 |
| 8,550,548 B2 | * | 10/2013 | Gibbons | A47D 13/02 297/184.13 |
| 2011/0148159 A1 | * | 6/2011 | Barron | A47D 7/04 5/636 |
| 2013/0292973 A1 | * | 11/2013 | Loaiza | A47D 13/02 297/184.13 |
| 2021/0370999 A1 | * | 12/2021 | Filipovitz | B62B 9/142 |

FOREIGN PATENT DOCUMENTS

| | | | | |
|---|---|---|---|---|
| GB | 2246547 A | * | 2/1992 | A47D 15/00 |
| GB | 2413275 A | * | 10/2005 | B60N 2/26 |

* cited by examiner

*Primary Examiner* — Anthony D Barfield

(57) ABSTRACT

Embodiments of the present invention illustrate a canopy apparatus for a child car seat providing a cover on an infant car seat and/or a sunshade over a child car seat comprising a cover body, two headrest covers connected at opposing ends of the cover body, an attachment mechanism and a tie. The attachment mechanism may be wrapped around a handle of an infant car seat while the cover body drapes down over the car seat providing a cover. The headrest covers may be placed on a first headrest and a second headrest at opposing sides in a vehicle, respectively, enabling the cover body to hang above the child car seat while the left and right side of the cover body drapes over the child car seat creating a shade. The tie may be tied to a grab handle to provide further security and headroom.

20 Claims, 3 Drawing Sheets

CONVERTIBLE CANOPY FOR CAR SEATS

CROSS-REFERENCE TO RELATED APPLICATIONS

This application claims the benefit of priority of U.S. design patent application Ser. No. 29/811,612, filed on Oct. 15, 2021, U.S. provisional application No. 63/414,564, filed on Oct. 9, 2022 and U.S. provisional application No. 63/416,499, filed on Oct. 15, 2022, the contents of which are herein incorporated by reference.

BACKGROUND OF THE INVENTION

The present invention relates to car seat accessories and, more particularly, a canopy for a child car seat.

Conventionally, a car seat cover for an infant car seat and a sunshade for a child car seat are two different types of art. Consequently, the scope of current infant car seat covers is limited to infant car seats. As a child outgrows an infant car seat, a need arises for alternatives to provide protection to the child from direct sunlight, especially the child's eyes.

Sunshades may be used as alternatives. Currently, there are two types of sunshades: window sunshades and canopy-style sunshades. Window sunshades are attached to a side window and/or a rear window. As window sunshades require to be attached to windows, window sunshades limit the use of the windows that the sunshades are installed on. Moreover, window sunshades do not fit perfectly on the windows as shapes and sizes of windows differ among different types and models of vehicles. Therefore, window sunshades leave gaps on the windows which allow sunlight to come through.

As a substitute of window sunshades, caregivers may use canopy-style sunshades, however, there exist some drawbacks to canopy-style sunshades: 1) canopy-style sunshades extend only partially over a car seat providing limited coverage; 2) canopy-style sunshades are not generally universal; and 3) headroom, the space between a child's head and the top of a canopy-style sunshade, is not adjustable potentially making it uncomfortable for a child, especially if the child is tall.

Due to the limitations of current car seat covers and sunshades mentioned above, a need exists for an alternative to current car seat covers and sunshades, which is the general object of the present invention.

BRIEF SUMMARY OF THE INVENTION

The present invention discloses a canopy apparatus for a child car seat comprising a cover body of flexible material and two headrest covers connected at opposing ends of the cover body. The cover body may be dimensioned to drape over the left and right side of the child car seat, in width, and the draped sides may extend below the head of a child in the child car seat. The headrest covers may be configured to fit over a first headrest and a second headrest of a vehicle, respectively; wherein the first headrest and the second headrest are at opposing sides (front and rear) of the vehicle. Although two headrest covers are preferred, one of the headrest covers may be replaced by an alternative means for securing the cover body to the first headrest or the second headrest of the vehicle. The length from the end of the headrest cover to the end of the second headrest cover or to the end of the means for securing may extend approximately from the first headrest to the second headrest of the vehicle.

Either or both of the headrest covers may include a drawstring or a means for preventing the headrest cover from easily shifting or coming off from the headrest of the vehicle. Furthermore, the headrest cover may be connected to the cover body without any extension mechanism or with at least one extension mechanism such as an elastic band, a strap with an adjustable buckle and the like for adjusting the distance between the headrest cover and the cover body.

The cover body may further comprise a tie; wherein the length of the tie is sufficient to reach from the cover body to a grab handle above the child car seat so that the tie may be fastened to the grab handle providing further security and/or headroom; and an attachment mechanism; wherein the attachment mechanism may include at least one fastener so that the attachment mechanism may be fastened to a carrying handle of an infant car seat.

The cover body may further comprise a side fastener on each of the draped sides and a corresponding fastener preferably located near the center of the cover body so that either or both of the draped sides of the cover body may be lifted by coupling the side fastener with the corresponding fastener.

Additionally, the cover body may comprise a window to allow additional air flow and a window cover to cover the window.

The present invention may be used as a cover on an infant car seat and/or used as a sunshade over a child car seat including an infant car seat, a convertible car seat, an all-in-one car seat, a booster seat and the like. Not only does the present invention work with any type of car seats mentioned above but also the present invention may be used with any type of car seat orientation such as forward facing and rear facing. Therefore, a caregiver may use the present invention throughout different stages of car seats as the child grows.

When the present invention is used as a sunshade in a vehicle, the headrest covers fit over the first headrest and the second headrest, respectively, hanging over the child car seat and the cover body creating a shade over the car seat. Therefore, the present invention does not require to be installed directly on the child car seat, and thus, the present invention provides a wide range of application, compatibility and versatility.

Further, the method of utilizing the headrests of the vehicle not only provides ample headroom to the child but also keeps the present invention from easily being pulled down by the child. Moreover, the caregiver can easily adjust the height of the present invention by moving either or both of the headrests of the vehicle upward or downward.

The method may also be especially useful when the caregiver desires to open or close the windows of the vehicle.

These and other features, aspects and advantages of the present invention will be better understood when considered in conjunction with the following description and the accompanying drawings.

BRIEF DESCRIPTION OF THE SEVERAL VIEWS OF THE DRAWING

The accompanying drawings are exemplary embodiments of the present invention and are to be considered illustrative rather than limiting. The dash lines shown illustrate hidden objects.

Figure 1:
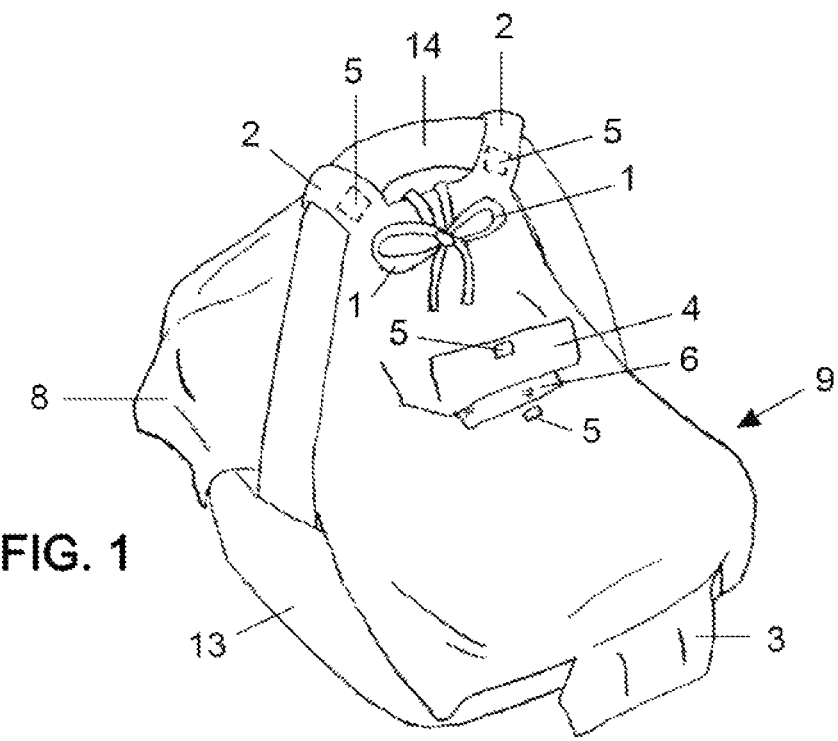
FIG. 1 is a perspective view of an exemplary embodiment of the present invention installed on an infant car seat with the window cover folded half way up.

Corresponding reference characters indicate corresponding components throughout the several views of the drawings. Skilled artisans will appreciate that elements in the FIGURES are illustrated for simplicity and clarity and have not necessarily been drawn to scale. For example, the dimensions of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments.

DETAILED DESCRIPTION OF THE INVENTION

The following detailed description is of the best currently contemplated modes of carrying out exemplary embodiments of the present invention. The description illustrates the general principles of the invention and is not to be considered in a limiting sense. Therefore, various features of the embodiments disclosed herein do not limit the claims of this application or the scope of the claims.

In this description, any directional terms such as upper, lower, top, bottom, left, right, over, under and the like refer to the invention as it is oriented and appears in the drawings and are used for convenience only. Furthermore, similar components and/or features may have the same reference figures and the description is applicable to any one of the similar components having the same reference figures.

Referring to FIGS. 1 through 6, the present invention may comprise a cover body 8 made of a strong and flexible material such as natural fibers, synthetic fibers and the like, a headrest cover 3 connected to one end of the cover body 8, and a second headrest cover 3 connected to the opposing end of the cover body 8. The cover body 8 may be dimensioned to drape over the left and right side of a child car seat 10, in width, and draped sides of the cover body 8 may extend below the head of a child in the child car seat 10. The headrest covers 3 may be configured to fit over a first headrest 11 and a second headrest 12 of a vehicle, respectively; wherein the first headrest 11 and the second headrest 12 are at opposing sides (front and rear) of the vehicle. Although it is preferred to have the second headrest cover 3, a strap, an elastic band, or the like may be used as an alternative to the second headrest cover 3 to secure the opposing end of the cover body 8 to the first headrest 11 or the second headrest 12 of the vehicle. The length from the end of the headrest cover 3 to the end of the second headrest cover 3 or the alternative means for securing the opposing end of the cover body 8 may extend approximately from the first headrest 11 to the second headrest 12 of the vehicle.

Either or both of the headrest covers 3 may include a drawstring 7 to fasten and therefore to prevent the headrest cover 3 from easily shifting or coming off from the first headrest 11 and/or the second headrest 12 of the vehicle. Although a drawstring is preferred, a different method such as attaching a non-slip fabric backing, anti-skid silicones and the like in the inner side of the headrest cover 3 may be used to achieve the goal of preventing the headrest cover 3 from slipping.

Either or both of the headrest covers 3 may be connected to the cover body 8 directly as depicted in the preferred embodiments, or the headrest cover 3 may be connected to the cover body 8 using an extension mechanism such as an elastic band, a strap with an adjustable buckle and the like. The extension mechanism may be used to allow the length between the headrest cover 3 and the cover body 8 to be adjustable so that the present invention may adapt to different distances between the first headrest 11 and the second headrest 12 of the vehicle. For example, an elastic band or a strap with an adjustable buckle may be used to connect the headrest cover 3 and the cover body 8; wherein the opposing ends of the elastic band or the strap are connected to the headrest cover 3 and the cover body 8, respectively. Then, the headrest cover 3 may be extended from the cover body 8 adapting to different distances.

The cover body 8 may further comprise a tie 1 made of a strong and flexible material such as natural fibers, synthetic fibers and the like. The tie 1 may extend from approximately in the middle of the cover body 8, wherein the length of the tie 1 is sufficient to reach from the cover body 8 to a grab handle 15 above the child car seat 10 so that the tie 1 may be fastened to the grab handle 15.

The cover body 8 may further comprise an attachment mechanism 2 such as a strap made of a strong and flexible material such as natural fibers, synthetic fibers and the like, and the attachment mechanism 2 may include at least one fastener 5 such as buttons, snap buttons, hook and loop fasteners and the like so that the attachment mechanism 2 may be fastened to a carrying handle 14 of an infant car seat 13.

In the preferred embodiments, two attachment mechanisms 2 and two ties 1 are illustrated; wherein the ties 1 may be spaced apart from each other and located in between the two attachment mechanisms 2. It is preferred to have two attachment mechanisms 2 and two ties 2. However, the cover body 8 may comprise any number of attachment mechanisms 2 and/or ties 1, or the attachment mechanism 2 or the tie 1 may be omitted. If the attachment mechanism 2 is omitted, the tie 1 may be used to fasten the present invention to the infant car seat 13.

The cover body 8 may have a side fastener 16 such as buttons, snap buttons, hook and loop fasteners and the like on each of the draped sides and a corresponding fastener (not shown) such as buttons, snap buttons, hook and loop fasteners and the like to be coupled with the side fastener 16; wherein the corresponding fastener may preferably be located near the center of the cover body 8 so that either or both of the draped sides of the cover body 8 may be lifted by coupling the side fastener 16 with the corresponding fastener providing visibility to the child in the child car seat 10. The corresponding fastener may be omitted, as depicted in the preferred embodiments. If the corresponding fastener is omitted, the side fastener 16 may be coupled with the fastener 5 included in the attachment mechanism 2 to lift either or both of the draped sides of the cover body 8.

The headrest covers 3 and the cover body 8 may include a plurality of fasteners 5 such as buttons, snap buttons, hook and loop fasteners and the like. The fasteners 5 are attached on the top of each of the headrest covers 3 and on the cover body 8 adjacent to each of the headrest covers 3. The fasteners 5 on the headrest covers 3 may be coupled with the fasteners 5 adjacent to each of the headrest covers 3 so that the headrest covers 3 may be folded and fastened to the cover body 8.

The cover body 8 may further comprise a window 6 and a window cover 4 positioned in front of a child in the infant car seat 13. The window 6 may allow the child in the infant car seat 13 to see outside of the cover body 9 and a caregiver to see the child in the infant car seat 13. The window 6 may include a screen made of a mesh material such as nylon, polyester and the like to allow air to flow in and out. The window cover 4 may be opened or closed using fasteners 5 such as buttons, snap buttons, hook and loop fasteners and the like located under the window 6 and on the window cover 4, respectively.

FIG. 1 illustrates an embodiment of the present invention used as the cover 9 on the infant car seat 13. The method may include the following. The attachment mechanisms 2 may be wrapped around the carrying handle 14 of the infant car seat 13 and fastened using the fasteners 5 included in the attachment mechanisms 2. The cover body 8 may drape down the infant car seat 13 and provide the tent-like cover 9.

Two headrest covers 3 connected at opposing ends of the cover body 8 may be left loose as shown in FIG. 1, or the headrest covers 3 may be folded and fastened to the cover body 8 by coupling the fasteners 5 on the headrest covers 3 with the fasteners 5 located on the cover body 8 adjacent to each of the headrest covers 3. The headrest covers 3 may provide extra weight to each opposing end of the cover body 8 when the present invention is used as the cover 9 on the infant car seat 13, and thus, the cover body 8 may not easily be blown off by wind or dislocated from the infant car seat 13.

FIG. 1. depicts the window cover 4 folded half way up revealing the window 6 in the cover body 8, however, the window 6 may be covered with the window cover 4 using the fasteners 5 located under the window 6 and on the window cover 4, respectively. The ties 1 may be tied together for organization and an aesthetically pleasing look or left unorganized.

Figure 2:
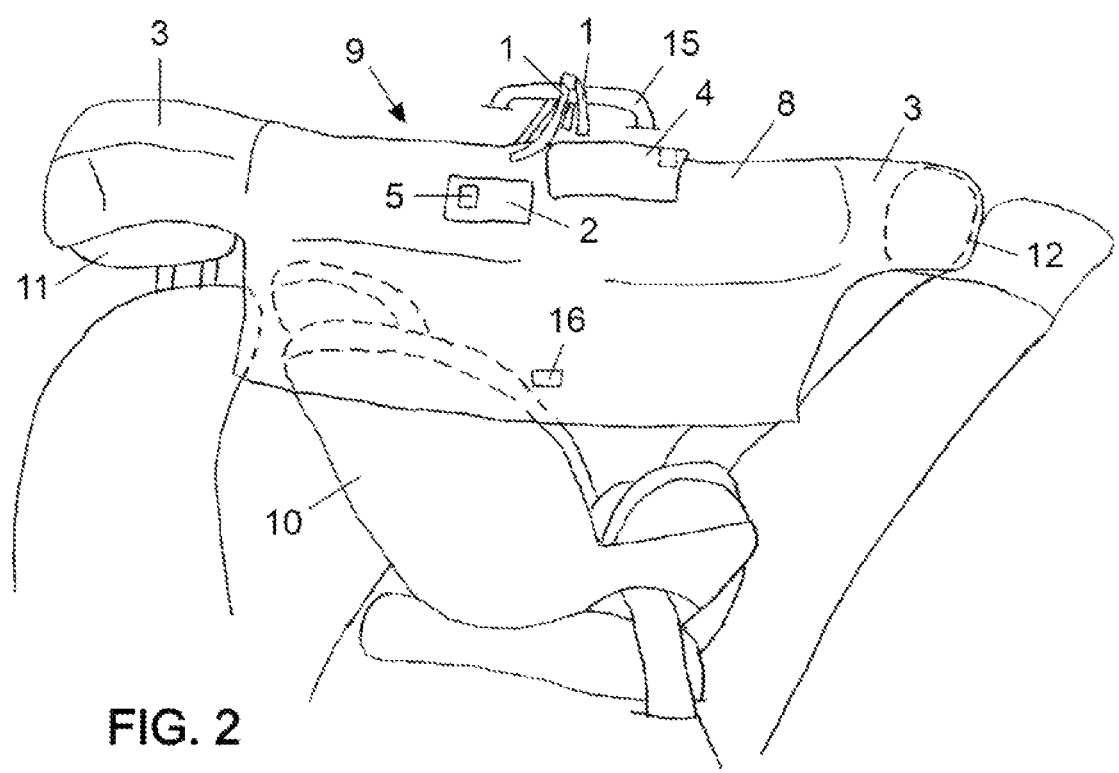
FIG. 2. is a perspective view of an exemplary embodiment of the present invention shown in a position of use over a child car seat in a vehicle.
Figure 3:
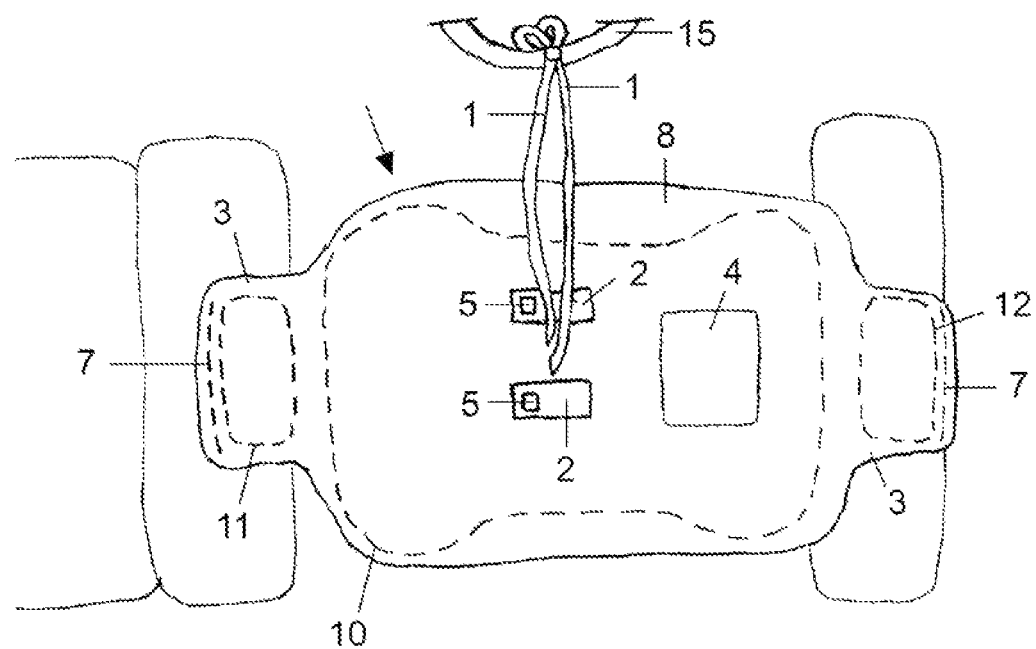
FIG. 3. is a top schematic view of an exemplary embodiment of the present invention installed over a child car seat in a vehicle.
Figure 4:
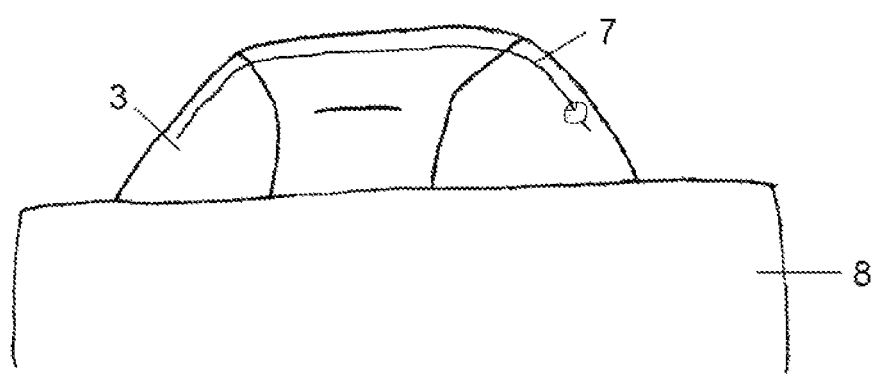
FIG. 4. is a partial view of an exemplary embodiment of the present invention with sections taken out, illustrating a headrest cover and a drawstring.
Figure 5:
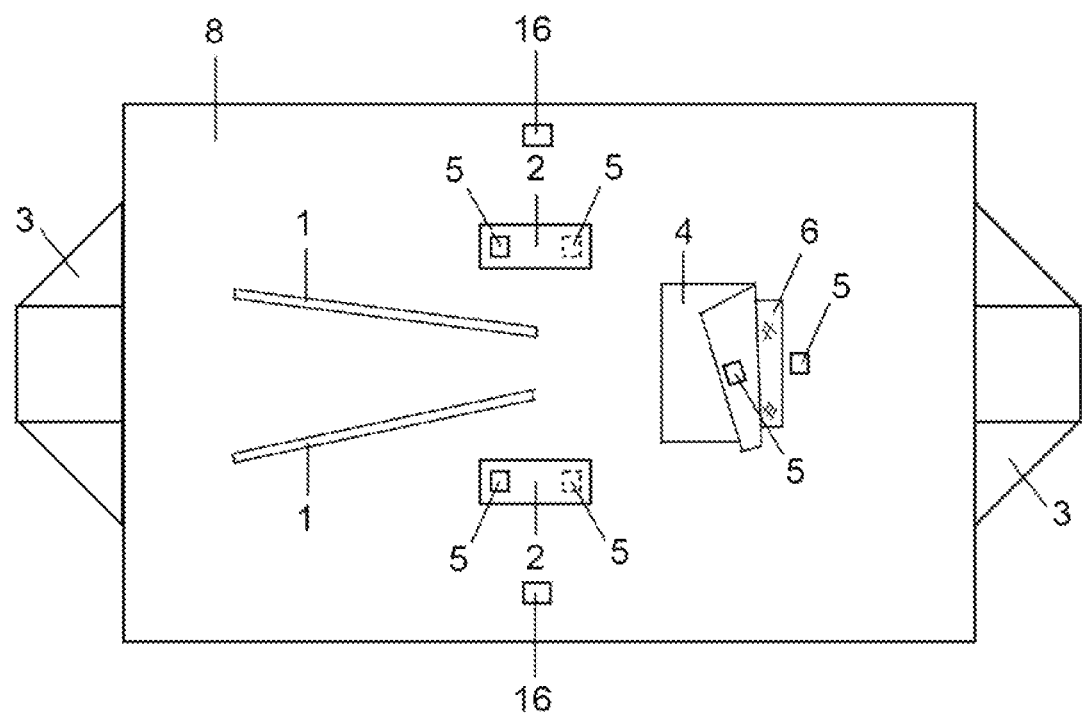
FIG. 5. is a top view of an exemplary embodiment of the present invention with the window cover partially folded up.
Figure 6:
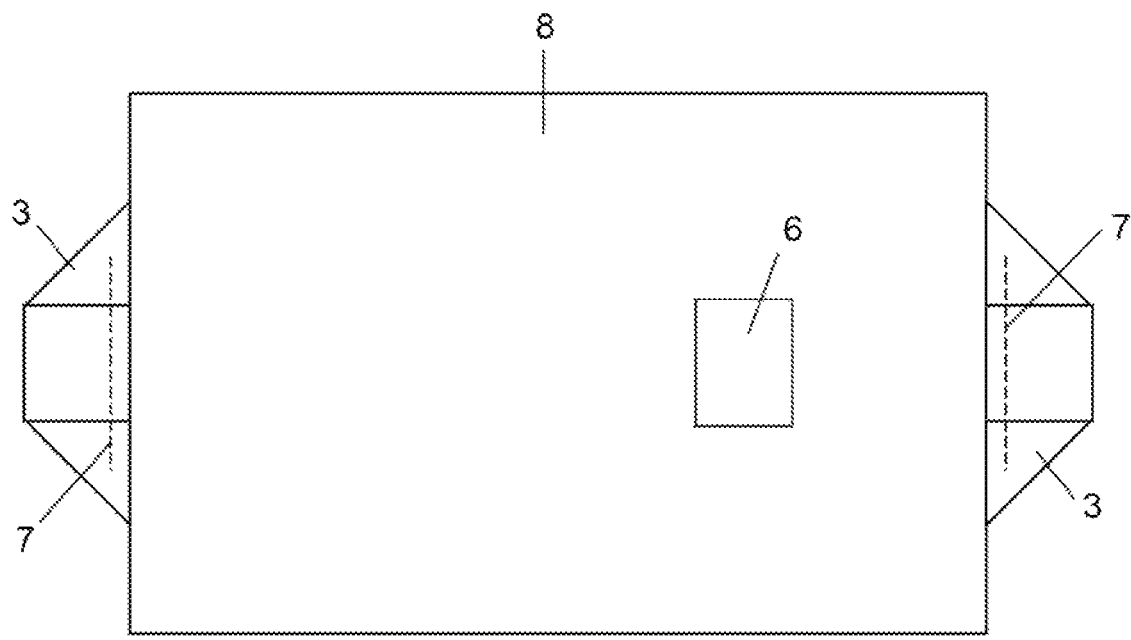
FIG. 6. is a bottom view of an exemplary embodiment of the present invention.

The preferred embodiments of the present invention used as the sunshade 9 over the child car seat 10 are illustrated in FIG. 2 and FIG. 3. The method of using the present invention as the sunshade 9 may include the following. Two headrest covers 3 connected at opposing ends of the cover body 8 may be fitted over the first headrest 11 and the second headrest 12, respectively. Then, the present invention may hang over the child car seat 10 and the cover body 8 may surround all three sides, the top, left and right, of the upper part of the child car seat 10 providing a shade to the child's upper body in the car seat 10. The caregiver may adjust the height of the present invention by moving one or both of the headrests of the vehicle upwards or downwards.

The ties 1 may be tied to the grab handle 15 of the vehicle above the child car seat 10 to further secure the present invention to the vehicle and/or to pull up approximately the middle part of the cover body 8 to provide more headroom and visibility as desired by the caregiver. FIG. 2 depicts the window cover 4 covering the window 6 by coupling the fastener 5 on the window cover 4 to the fastener 5 on the cover body 8 below the window 6, however, the window cover 4 may be folded open to allow additional airflow.

The draped sides of the cover body 8 may be lifted at a folded condition by coupling the side fasteners 16 located on each of the draped sides of the cover body 8 with the fasteners 5 included in the attachment mechanisms 2.

It should be understood that the above-mentioned description and features relate to exemplary embodiments of the present invention and that various substitutions, modifications, additions, variations or rearrangements may be made without departing from the spirit or scope of the present invention.

Further, given the above disclosure, one skilled in the art may discover other applications and/or develop other means to provide a combination of a car seat cover and a sunshade. Those other applications and means are considered within the scope and intent of the present invention disclosed herein and within the scope of this patent.

As used herein, the terms "comprise," "comprising," "include," "including," "have," "having," or any other variation thereof, are intended to cover a non-exclusive inclusion. For example, an apparatus that comprises a list of elements is not necessarily limited to only those elements but may include other elements not expressly listed or inherent to such apparatus.

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," and "in one embodiment."

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

What is claimed is:

1. A canopy apparatus configured to provide a cover on an infant car seat and/or a sunshade over a child car seat, comprising:
    a cover body of flexible material; wherein said cover body is dimensioned to drape over the left and right side of a child car seat, in width; wherein draped sides of said cover body extend below the head of a child in said child car seat;
    a headrest cover connected to an end body along an edge of said cover body to extend therefrom; wherein said headrest cover is configured to fit over a headrest of a vehicle;
    a means for securing said cover body to an opposing headrest of said vehicle; wherein said means is located at opposing end of said headrest cover; wherein the length from the end of said headrest cover to the end of said means extends approximately from said headrest to said opposing headrest of said vehicle; and
    at least one tie that is attached to a middle portion of said cover body to secure said canopy to an infant car seat and/or to said vehicle and/or to pull up said canopy by being tied to a grab handle.

2. The canopy of claim 1, wherein said headrest cover includes at least one method to prevent said headrest cover from easily shifting or coming off from said headrest of said vehicle.

3. The canopy of claim 1, wherein said headrest cover is connected to said cover body using at least one extension mechanism; wherein said extension mechanism allows the length between said headrest cover to said cover body to be adjustable.

4. The canopy of claim 1, wherein said means is a second headrest cover.

5. The canopy of claim 4, wherein said second headrest cover is configured to fit over said opposing headrest.

6. The canopy of claim 4, wherein said second headrest cover includes at least one method to prevent said second headrest cover from easily shifting or coming off from said opposing headrest of said vehicle.

7. The canopy of claim 4, wherein said second headrest cover is connected to said cover body using at least one extension mechanism; wherein said extension mechanism allows the length between said second headrest cover to said cover body to be adjustable.

8. The canopy of claim 1, wherein a length of said tie is sufficient to reach from said cover body to said grab handle above said child car seat so that said tie may be fastened to said grab handle.

9. The canopy of claim 1, further comprises at least one attachment mechanism; wherein said attachment mechanism includes at least one fastener.

10. The canopy of claim 1, wherein said cover body includes at least one side fastener on each of said draped sides so that either or both of said draped sides of the cover body may be lifted.

11. The canopy of claim 10, wherein said cover body further includes at least one corresponding fastener to be coupled with said side fastener so that said draped sides may be fastened in a folded position.

12. A canopy apparatus configured to provide a cover on an infant car seat and/or a sunshade over a child car seat, comprising:
  a cover body of flexible material; wherein said cover body is dimensioned to drape over the left and right side of a child car seat, in width; wherein draped sides of said cover body extend below the head of a child in said child car seat;
  a headrest cover connected to an end along an edge of said cover body to extend therefrom; wherein said headrest cover is configured to fit over a headrest of a vehicle;
  a means for securing said cover body to an opposing headrest of said vehicle; wherein said means is located at opposing end of said headrest cover; wherein the length from the end of said headrest cover to the end of said means extends approximately from said headrest to said opposing headrest of said vehicle; and at least one attachment mechanism that is attached to a middle portion of said cover body to secure said canopy to said infant seat.

13. The canopy of claim 12, wherein said headrest cover includes at least one method to prevent said headrest cover from easily shifting or coming off from said headrest of said vehicle.

14. The canopy of claim 12, wherein said headrest cover is connected to said cover body using at least one extension mechanism; wherein said extension mechanism allows the length between said headrest cover to said cover body to be adjustable.

15. The canopy of claim 12, wherein said means is a second headrest cover.

16. The canopy of claim 15, wherein said second headrest cover is configured to fit over said opposing headrest.

17. The canopy of claim 15, wherein said second headrest cover includes at least one method to prevent said second headrest cover from easily shifting or coming off from said opposing headrest of said vehicle.

18. The canopy of claim 15, wherein said second headrest cover is connected to said cover body using at least one extension mechanism; wherein said extension mechanism allows the length between said second headrest cover to said cover body to be adjustable.

19. The canopy of claim 12, wherein said cover body further comprises at least one tie to secure said canopy to an infant car seat and/or to said vehicle and/or to pull up said canopy by being tied to a grab handle; wherein a length of said tie is sufficient to reach from said cover body to said grab handle above said child car seat so that said tie may be fastened to said grab handle.

20. The canopy of claim 12, wherein said cover body includes at least one side fastener on each of said draped sides and at least one corresponding fastener so that either or both of the draped sides of the cover body may be lifted by coupling said side fastener with said corresponding fastener.

\* \* \* \* \*